United States Patent
Falevsky et al.

(10) Patent No.: US 11,072,755 B2
(45) Date of Patent: Jul. 27, 2021

(54) COMPOSITIONS AND METHODS FOR PRODUCTION OF CARBONIZED PELLETS FROM BIOMASS

(71) Applicant: Aeonian Inc., Wilmington, DE (US)

(72) Inventors: Louise M. Falevsky, Rolling Hills Estates, CA (US); Elam Anders Magnus Lind, Penang (MY); Kawnish Kirtania, Pirojpur (BD)

(73) Assignee: AEONIAN LTD., Wilmington, DE (US)

( * ) Notice: Subject to any disclaimer, the term of this patent is extended or adjusted under 35 U.S.C. 154(b) by 0 days.

(21) Appl. No.: 17/075,431

(22) Filed: Oct. 20, 2020

(65) Prior Publication Data

US 2021/0115348 A1 Apr. 22, 2021

Related U.S. Application Data

(60) Provisional application No. 62/924,088, filed on Oct. 21, 2019.

(51) Int. Cl.
*C10L 9/08* (2006.01)
*C10L 5/40* (2006.01)
*C10L 5/44* (2006.01)

(52) U.S. Cl.
CPC .............. *C10L 9/086* (2013.01); *C10L 5/403* (2013.01); *C10L 5/442* (2013.01); *C10L 5/445* (2013.01); *C10L 2200/0469* (2013.01); *C10L 2290/02* (2013.01); *C10L 2290/08* (2013.01); *C10L 2290/24* (2013.01); *C10L 2290/544* (2013.01)

(58) Field of Classification Search
CPC .......... C10L 9/086; C10L 5/442; C10L 5/403; C10L 5/445; C10L 2290/08; C10L 2290/544; C10L 2290/02; C10L 2290/24; C10L 2200/0469
See application file for complete search history.

(56) References Cited

U.S. PATENT DOCUMENTS

| 2008/0209797 A1* | 9/2008 | Rendina | ................. | C10G 11/00 44/307 |
| 2014/0275668 A1 | 9/2014 | Walter | | |
| 2017/0240934 A1* | 8/2017 | Bai | ........................ | C10B 57/08 |

(Continued)

FOREIGN PATENT DOCUMENTS

| CN | 201610385938 | 6/2016 |
| CN | 106047384 A | 10/2016 |

(Continued)

OTHER PUBLICATIONS

International search report dated Feb. 9, 2021, for related PCT application No. PCT/US2020/056496, filed Oct. 20, 2020.
(Continued)

*Primary Examiner* — Ellen M McAvoy
*Assistant Examiner* — Chantel L Graham
(74) *Attorney, Agent, or Firm* — Fish IP Law, LLP

(57) ABSTRACT

Methods are provided for simple and efficient carbonization of cellulosic and/or lignin-containing materials to generate a char suitable for use as a pellet fuel. Cellulosic and/or lignin-containing waste materials can be suspended in water with a catalyst and, optionally, a carbonate and heated to generate a char. This char can be dried and formed into carbonized pellets suitable for use as fuel.

21 Claims, 2 Drawing Sheets

(56) References Cited

U.S. PATENT DOCUMENTS

| | | | |
|---|---|---|---|
| 2017/0283725 A1* | 10/2017 | Peus | ............... C10L 9/086 |
| 2017/0306440 A1* | 10/2017 | Hein | ............... C22B 1/00 |
| 2018/0273846 A1 | 9/2018 | Garcia-Perez | |
| 2018/0291275 A1 | 10/2018 | Goodrich | |
| 2019/0153325 A1 | 5/2019 | Garcia-Perez | |

FOREIGN PATENT DOCUMENTS

| | | |
|---|---|---|
| KR | 1020130152573 P | 12/2013 |
| WO | 2015061802 | 4/2015 |

OTHER PUBLICATIONS

Sharifah Bee Abd Hamid; et al. "Catalytic Hydrothermal Upgrading of a-Cellulose using Iron Salts as a Lewis Acid," Nanotechnology & Catalysis Research Centre, Malaya, Kuala Lumpur, Malaysia. 13 pages.

Tanveer Ahmed Khana; et al. "Hydrothermal carbonization of lignocellulosic biomass for carbon rich material preparation: A review." Lab. of Adhesion & Bio-Composites, Program in Environmental Materials Science, Research Institute of Agriculture and Life Sciences, College of Agriculture and Life Sciences, Seoul National University, Seoul, 08826, Republic of Korea. 16 pages.

\* cited by examiner

COMPOSITIONS AND METHODS FOR PRODUCTION OF CARBONIZED PELLETS FROM BIOMASS

This application claims the benefit of U.S. Provisional Patent Application No. 62/924,088, filed Oct. 21, 2020. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is production of black pellets from biomass materials, particularly waste products from wood processing, forestry lumbering, and agriculture.

BACKGROUND

The background description includes information that may be useful in understanding the present invention. It is not an admission that any of the information provided herein is prior art or relevant to the presently claimed invention, or that any publication specifically or implicitly referenced is prior art.

Coal represents a major fuel source utilized for energy production, but has a number of shortcomings. As a fossil fuel, coal is a major source of greenhouse gases. The process of mining coal also has a negative environmental impact. In addition, many coal deposits provide material with a significant sulfur content, and requires the use of complex and expensive scrubbing systems when used as fuel. In addition, due to environmental concerns, an increasing number of coal-fueled on demand generation plants are being decommissioned and subsequently sitting idle, despite ever increasing demands for electric power.

White wood pellets have been proposed as an alternative to coal. White pellets are produced by compression of saw dust and wood shavings. The resulting pellets have relatively low energy density and are hygroscopic. Accordingly, they must be stored and shipped under protected conditions. In addition, existing coal-fired plants would require significant refitting to accommodate this fuel.

Black pellets are an attractive alternative to coal. Typically, a product of the decomposition of cellulose and/or lignin containing plant materials where the materials itself is derived from renewable resources and is relatively carbon-neutral when used as fuel. When dried and compressed the resulting material is a black solid with an energy density that approaches that of coal. It can be mixed with coal, and if necessary, can be pulverized into a powder. In addition, black pellets are hydrophobic and can be exposed during storage and shipping.

Pyrolysis (i.e. heating in the absence of oxygen), however, typically requires relatively high temperatures and can involve processes that do not scale well. The most common methods for producing black pellets are torrefaction and steam explosion. Torrefaction is a proven technology in which biomass is sized by chipping, followed by treatment in a high temperature (>200° C.) low oxygen environment. The resulting pyrolyzed material is subsequently ground and compressed into pellets. Unfortunately, high temperatures render this process relatively energy intensive, while the need to maintain a low oxygen environment impacts scalability. In addition, the process is frequently incomplete, with pyrolysis only occurring on the exterior of particulates produced by chipping. Accordingly, torrefaction has not seen widespread adoption.

Steam explosion is performed by applying high pressure (which expands the biomass to render interior fibers more accessible) and temperatures. The resulting materials are brown in color, and while hydrophobic typically provide lower energy density than black pellet materials produced by other processes.

One way to reduce the cost of pyrolysis is to utilize waste heat from other processes. For example, U.S. Patent Application Publication Nos. 2014/0275668 and 2019/0153325, to Walter and Garcia-Perez, describe methods that perform pyrolysis of materials suspended in supercritical fluids and derive the heat required for the process from waste heat generated by nuclear power plants. These processes are described as yielding a variety of products, including a substitute for coal. However, realization of this approach at an industrial scale requires a substantial nuclear energy infrastructure.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Efforts have also been made to improve the efficiency of pyrolysis reactions. For example, United States Patent Application Publication No. 2018/273846, to Walter and Garcia-Perez, describe conversion of methane separated from the tail gas (produced by pyrolysis of biomass) to formic acid via the water shift reaction. This formic acid is subsequently recycled back into the pyrolysis reaction as a source of hydrogen. This method, however, results in increased yield of light pyrolysis products (e.g. oils). It is, therefore, not clear if this method can improve yield of materials suitable for production of black pellets.

EPO Patent Application Publication No. 3060718, to Delgass et al., describes the use of a hydrooxygenation catalyst with the lignin fraction of a biomass feedstock in order to lower the energy barrier to a pyrolysis reaction producing specified high value organic intermediates. The catalysts under consideration are metals provided on a solid support, however, and it is not apparent if it can be utilized with particulate raw materials. It is also not clear if this technology would be applicable to both cellulose and lignin components, or if it can produce materials suitable for black pellets at a practical scale.

Thus, there is still a need for an effective and economical method for pyrolysis or other method of decomposition of cellulose and lignin containing materials

SUMMARY OF THE INVENTION

Systems and methods are provided for decomposition of lignin-containing cellulosic materials, preferably waste materials, to provide a char suitable for production of a carbonized pelleted fuel.

One embodiment of the inventive concept is a method for producing a char, by obtaining a raw material that includes a cellulose, a hemi-cellulose, and/or a lignin, contacting the raw material with a metal salt (such as $FeCl_3$) and, optionally, a carbonate salt (such as $Na_2CO_3$) in an aqueous medium to form a reaction mixture, and heating the reaction mixture to at least 90° C. for at least 30 minutes to generate a suspension that includes the char. Inorganic material is leached from this char, which is then compressed. Suitable raw materials include lumber or other wood waste, yard waste, paper waste, and/or biomass. The metal salt and/or the carbonate salt can be provided at from 1% to 30% of dry weight of the raw material. In some embodiments the raw material is sized prior to processing. In some embodiments the reaction mixture is heated to a temperature of from 90 C to 200° C., and can be mixed while heating. In some embodiments the metal oxide can be separated from the suspension, for example by applying a magnetic field, centrifugation, or leaching. The char can be dried to form a dried char prior to compression.

Another embodiment of the inventive concept is a method of producing a fuel by obtaining a raw material that includes a cellulose, a hemi-cellulose, and/or a lignin, contacting the raw material with a metal salt (such as $FeCl_3$) and, optionally, a carbonate salt (such as $Na_2CO_3$), in an aqueous medium to form a reaction mixture, and heating the reaction mixture to a temperature of from 90 C to 200° C. for at least 30 minutes to generate a fuel comprising the char. The metal salt and/or the carbonate salt can be provided at from 1% to 30% of dry weight of the raw material. Suitable raw materials include lumber or other wood waste, yard waste, paper waste, and/or biomass. Some embodiments of the inventive concept include a step of separating a metal oxide from the suspension, for example using a magnetic field, centrifugation, and/or leaching with a lixiviant. In some embodiments reaction products can be dried and compressed to form a pellet, thereby providing a pelleted fuel.

Various objects, features, aspects and advantages of the inventive subject matter will become more apparent from the following detailed description of preferred embodiments.

DETAILED DESCRIPTION

Figure 1:
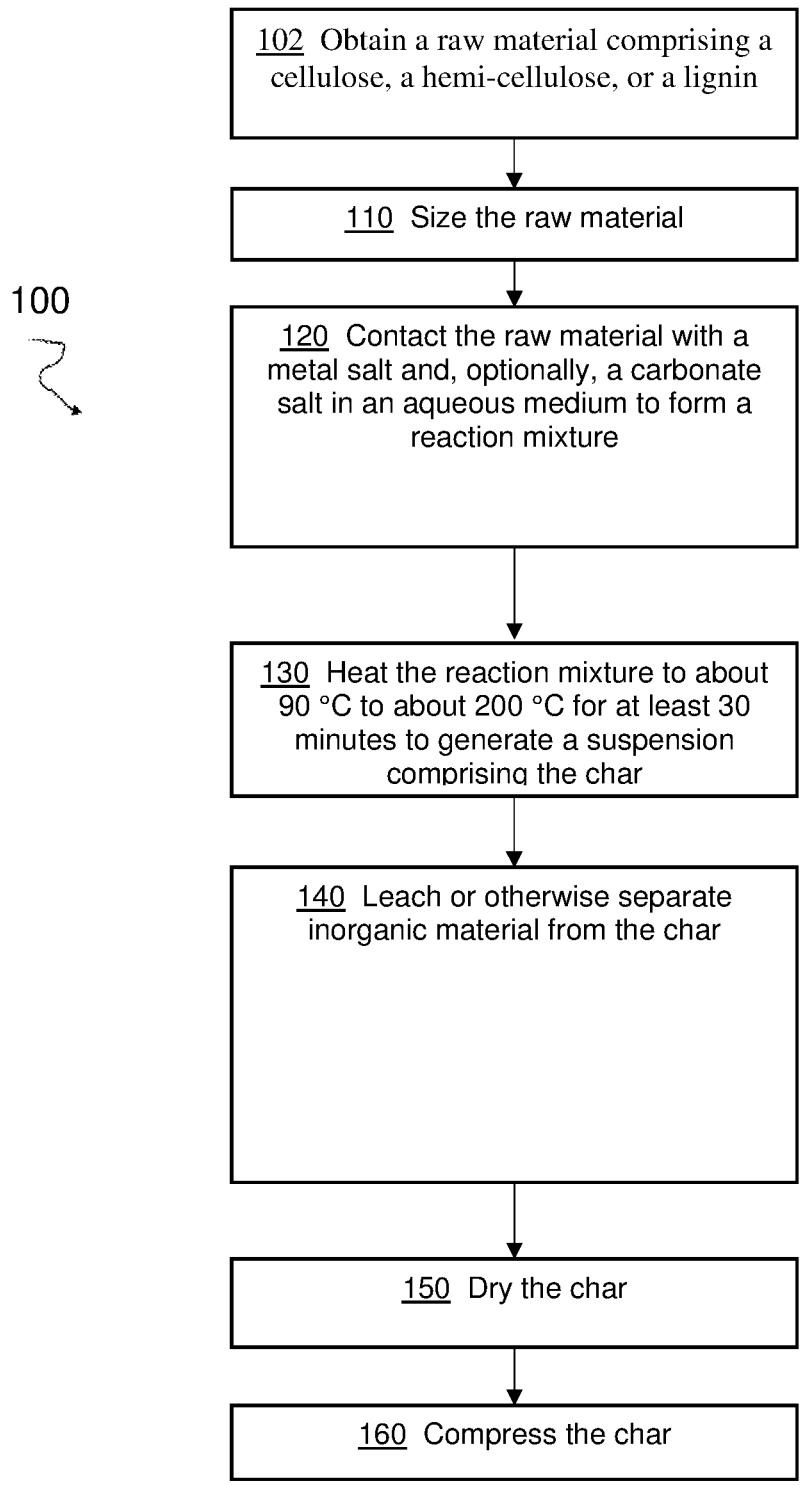
FIG. 1 provides a schematic depiction of a process for producing a char through carbonization utilizing methods of the inventive concept.

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems and methods by which one can perform decomposition and/or carbonization of lignocellulosic materials in an aqueous suspension and at moderately elevated temperatures to generate a suspension of char. This material can be collected, dried, and compressed to provide a carbon-neutral alternative to coal that is directly applicable to coal-utilizing systems without the need for adaptation.

Surprisingly, the Inventors have found that suspending cellulosic and/or lignin-containing material in an aqueous solution containing a metal salt catalyst (e.g. $FeCl_3$) and, optionally, a carbonate (such as $Na_2CO_3$), followed by moderate heating (e.g. up to about 90° C., 100° C., 110° C., 120° C., 130° C., 140° C., 150° C., 160° C., 170° C., 180° C., 190° C., 200° C.) yields char in the form of a black aqueous slurry. The reaction is rapid and can be complete in less than 90 minutes, with loss of fibrous structure and complete decomposition of the starting material. Char can be easily recovered from this slurry, dried, and compressed to yield a suitable substitute for coal fuel. Similarly, water can be recovered from this process and recycled, further minimizing environmental impact. Iron oxide recovered from the process can be utilized in the production of pigments or cycled into steel-making operations as a raw material. In some embodiments recovered iron oxide can be treated to regenerate a catalyst material (e.g. $FeCl_3$) that is recycled into the process.

One should appreciate that the disclosed techniques provide many advantageous technical effects including rapid and efficient production of a low environmental impact substitute for coal; using materials that are generally considered waste products.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

A wide variety of plant or plant-based materials are suitable as sources of cellulosic or lignin-containing raw materials. In preferred embodiments the raw material is a waste product or otherwise normally discarded plant material. Examples include waste bark, branches, and other trimmings from tree harvesting, waste stalks and/or leaves from agricultural crops (corn, wheat etc.), yard waste, paper waste, oil palm residue such as oil palm trunks, fronds, stumps, empty fruit bunches, fibers, cellulosic biomass, etc. In some embodiments such raw material is dried prior to use. In other embodiments the raw material is not dried, and moisture content is balanced against the amount of water utilized in the process. Raw material can be sized prior to utilization, for example by chipping, cutting, shaving, and similar processes. Raw material can be sized to produce particulates having a mean diameter ranging from about 1 mm to about 10 cm.

In methods of the inventive concept the raw materials are processed in an aqueous media. Within this application the term aqueous media is defined as a liquid medium that only utilizes water as a solvent. Such an aqueous medium can include dissolved salts and suspended materials (e.g. colloids). Accordingly, raw materials to be converted to char are placed in sufficient water to at least provide surface coverage of the raw material. In preferred embodiments enough water is provided to suspend the raw material.

In methods of the inventive concept decomposition is performed by contacting the raw material with a metal salt catalyst (such as $FeCl_3$, $FeCl_2$, $FeCO_3$, $Fe_2(CO_3)_3$, and other suitable transition metal salts) and, in some embodiments, a carbonate (e.g. $Na_2CO_3$, $CaCO_3$, etc.). The Inventors believe that a variety of metal salts can act as suitable catalysts, and that such suitability can be determined by application to the method described herein and observation of suitable reaction products. In some embodiments activity of a catalyst can be augmented by the addition of additional compounds, such as a peroxide.

In preferred embodiments the raw material is contacted with an aqueous medium, followed by introduction of $FeCl_3$ and $Na_2CO_3$. In some embodiments one or both of these are added as dry granular materials. In other embodiments one or both of these are added as aqueous solutions. In some embodiments the raw material can initially be suspended in an aqueous medium containing dissolved $FeCl_3$, followed by the addition of $Na_2CO_3$. In other embodiments the raw material can be initially suspended in an aqueous medium containing dissolved $Na_2CO_3$, followed by addition of $FeCl_3$.

The amount of metal salt catalyst (such as $FeCl_3$) and/or $Na_2CO_3$ can be adjusted to accommodate different raw materials and/or desired degree of decomposition. For example, $FeCl_3$ and/or $Na_2CO_3$ can be provided at from 1 to 30 wt % relative to the dry weight of the raw material. In preferred embodiments the catalyst is provided at from 1 to 5% relative to the dry weight of the raw material.

Catalyst content, processing time, and/or processing temperature can be optimized to provide suitable results with different raw or source materials. In a typical method of the inventive concept a cellulosic and/or lignin-containing raw material is suspended in water. $FeCl_3$ and $Na_2CO_3$ are added, preferably with stirring to aid in dispersal. In some embodiments pH can be controlled by the addition of acid or base during the process. For example, aqueous solutions of $FeCl_3$ are acidic, and pH during the process can range from about 1.5 to about 4. The temperature of the reaction mixture is then raised, typically to between 160° C. and 200° C. This temperature is maintained for from 30 minutes to 4 hours, during which char formation occurs. In preferred embodiments mixing is provided during decomposition, for example by stirring or use of a circulating pump. The resulting product is char particulates in an aqueous medium. This product can also include colloidal iron oxide.

The size of the char particles and the consistency of this reaction product depend on a number of factors, including the raw material used, the amount of water used, the amount of catalyst used, the temperature of the reaction, and the time spent at elevated temperature. One, two, three, four, or all of these factors can be optimized in order to provide a suitable char by an economically feasible process. Accordingly, in some embodiments an intermediate char product can present as a damp bed of relatively large particulates, a slurry of suspended fine char particulates, etc.

Char materials derived from methods of the inventive concept can be dried and compressed for use as a coal fuel substitute and/or used with coal in co-firing. If removal of metal salts and oxides is not required, the decomposed reaction product can be dried (for example, by heating, lyophilization, exposure in a low humidity environment, etc.) and compressed (for example, into pellets or briquettes) without further processing. If the presence of metal salts and/or oxides is inconsistent with requirements these can be removed by processing as described above and the resulting cleaned char dried and compressed.

FIG. 1 depicts a generic embodiment (100) of the inventive concept for producing a char by carbonization in aqueous media (i.e. in the absence of organic solvents). As shown, after obtaining a suitable raw material (102) the raw material can be sized (110), if necessary. The raw material is subsequently suspended in an aqueous media and a suitable catalyst (such as $FeCl_3$) is added (120). In some embodiments a carbonate salt can be added. This suspension is then heated to about 90° C. to about 200° C. (130) to generate a reaction mixture in which carbonization of the raw material takes place, to ultimately generate a suspension of char. Unwanted materials can be removed (140) from this char (for example, by leaching). The char so produced is then dried (150). In some embodiments the dry char can be compressed (160), for example into carbonized pellets or briquettes.

Figure 2:
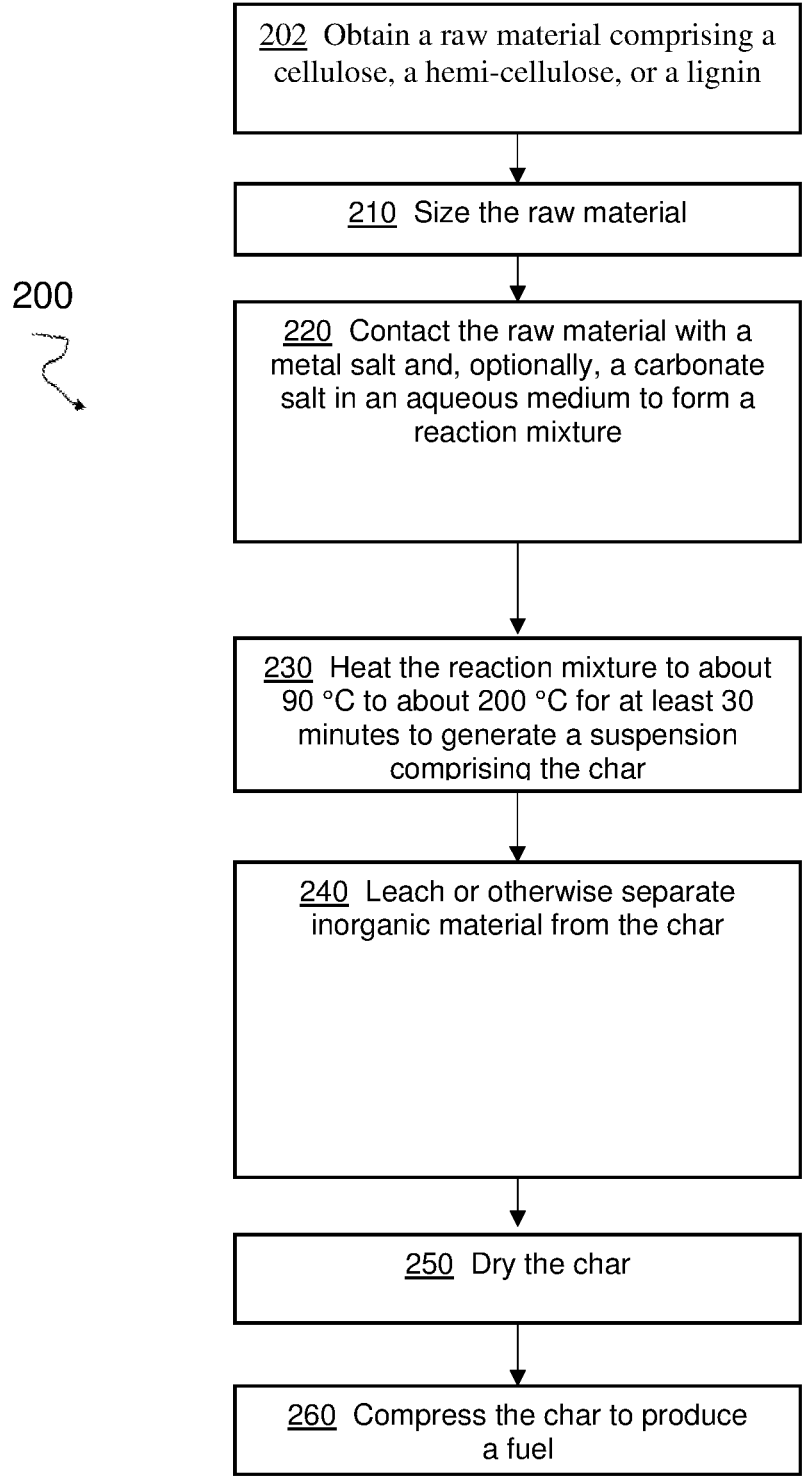
FIG. 2 provides a schematic depiction of a process for producing a char fuel through carbonization utilizing methods of the inventive concept.

FIG. 2 depicts a generic embodiment (200) of the inventive concept for producing a char fuel by carbonization in aqueous media (i.e. in the absence of organic solvents). As shown, after obtaining a suitable raw material (202) the raw material can be sized (210), if necessary. The raw material is subsequently suspended in an aqueous media and a suitable catalyst (such as $FeCl_3$) is added (220). In some embodiments a carbonate salt can be added. This suspension is then heated to about 90° C. to about 200° C. (230) to generate a reaction mixture in which carbonization of the raw material takes place, to ultimately generate a suspension of char. Unwanted materials can be removed (240) from this char (for example, by leaching). The char so produced is then dried (250) for use as a fuel. In some embodiments the dry char can be compressed (260), for example into carbonized pellets or briquettes, to support a particular fuel format. In other embodiments the char can be sized (for example, by milling or grinding) to provide a free-flowing particulate fuel.

In an example of a typical process of the inventive concept as it is applied to spruce and/or pine waste, the following materials are supplied to a reactor:

| Component | Material | Amount (g) |
| --- | --- | --- |
| Feedstock | Spruce/Pine chips (dry) | 29.3 |
| Catalyst A | $FeCl_3$ | 4.1 |
| Catalyst B | $Na_2CO_3$ | 2.34 |
| Solvent | Water | 274 |

This provides a water:dry feedstock weight ratio of 935%. Air is used as an impregnation gas without modification. The temperature is increased to 170° C. using a suitable heating method (e.g. electrical resistance heater, heat exchanger, steam injection, etc.), however lower temperatures (e.g. 150° C. or lower) can be used. In some embodiments heat can be obtained as a byproduct of another industrial process, which would otherwise be lost as waste heat. The pressure in this exemplary process was maintained at 8.5 bar, however lower pressures may be used. In an exemplary process the process was continued for 90 minutes, however shorter times (e.g. 30 minutes, 40 minutes) or longer (e.g. 100 minutes, 120 minutes, 150 minutes, 180 minutes) may be used.

This process provided a black suspension/slurry, which was cooled and dried (overnight at 70° C.) until it reached a constant weight of 21 g. Energy content was determined to be 21.85 MJ/kg, comparable to that of coal. Combustion efficiency of such a dried char product can be at least about 60%, 70%, 80%, 90%, or greater than 90%. In the example cited above combustion efficiency of combustion was found to be greater than about 80%. The material was also found to show low water absorption (<9.4% after 15 hours of immersion).

Due to the nature of the catalysts used and the use of a completely aqueous solvent system, it is possible for processes of the inventive concept to generate solids and soluble products other than the char resulting from decomposition of lignocellulosic material. Such solids can include colloidal suspensions (e.g. colloidal iron oxide). Soluble products can include metal salts (such as NaCl). If the application to which char provided by methods of the inventive concept is tolerant of such byproducts they may be left in place during subsequent processing. If the application to which the char provided by methods of the inventive concept is not tolerant of such by products or if presence of the byproduct produces an unwanted cosmetic effect (e.g. excess iron oxide can produce a brown colored material) they can be removed. Such removal can take place during separation of char from the fluid components of the reaction mixture produced by the carbonization reaction, following isolation of char, following compression of the char into pellets, or during two or more of these steps.

In some embodiments of the inventive concept it can be desirable to remove residual salts (such as NaCl) and/or metal oxides (such as iron oxide) and nutrients and other inorganic material (such as N, P, K, Ca, and Si) termed as ashes from the intermediate reaction product. Soluble materials, such as NaCl, can be removed to a large extent by separation of the liquid component from the solid char material (with the unwanted soluble materials being retained in the liquid fraction). This can be accomplished by any suitable means, including filtration, settling, and/or centrifugation. Relatively insoluble materials (such as iron oxide) can be separated from the char particulates by adding weak acids in order to neutralize ashes or by differences in density (e.g. through settling and decanting, centrifugation), size (e.g. by filtration), treatment with a suitable lixiviant (e.g. $MgCl_2$), and/or by magnetic behavior.

Some residual materials (such as sodium, chlorine, etc.) can be recovered from solid products by leaching (e.g. with $KNO_3$ in DMSO to remove chloride, with water in the presence of gypsum to remove sodium). Alternatively, such materials can be extracted using a suitable lixiviant. Similarly, such residual materials can be recovered from wastewater generated during char production and from ashes produced by combustion of the char. In preferred embodiments residual materials so recovered can be treated and recycled, and/or wastewater generated by such recovery efforts can be treated and recycled.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method for producing a low water absorbance char, comprising:
    obtaining a raw material comprising a cellulose, a hemicellulose, or a lignin;
    contacting the raw material with catalyst comprising a soluble metal salt and, optionally, a carbonate salt in an aqueous medium to form a reaction mixture, wherein the metal salt is provided at from 1% to 30% of dry weight of the raw material;
    heating the reaction mixture to at least 90° C. to 150° C. for at least 30 minutes to 4 hours to generate an suspension comprising the char;
    leaching inorganic material from the char;
    drying the suspension until it reaches a constant weight to generate a dried char having low water absorbance; and
    compressing the dried char.

2. The method of claim 1, wherein the raw material is selected from the group consisting of lumber or other wood waste, yard waste, paper waste, and biomass.

3. The method of claim 1, wherein the carbonate salt is $Na_2CO_3$.

4. The method of claim 1, wherein the metal salt is $FeCl_3$.

5. The method of claim 1, comprising the step of sizing the raw material.

6. The method of claim 1, wherein the carbonate salt is provided at from 1% to 30% of dry weight of the raw material.

7. The method of claim 1, comprising mixing the reaction mixture while heating.

8. The method of claim 1, comprising separating a metal oxide from the suspension.

9. The method of claim 8, wherein separating is performed by applying a magnetic field.

10. The method of claim 8, wherein separating is performed by centrifugation.

11. The method of claim 8, wherein separating is performed by leaching with a lixiviant.

12. The method of claim 1, wherein drying the char is performed until the char has a constant weight.

13. A method of producing a char fuel with low water absorption, comprising:
   obtaining a raw material comprising a cellulose, a hemicellulose, or a lignin;
   contacting the raw material with a metal salt and, optionally, a carbonate salt in an aqueous medium to form a reaction mixture, wherein the metal salt is provided at from 1% to 30% of dry weight of the raw material, and the carbonate salt is provided at from 1% to 30% of dry weight of the raw material; and
   heating the reaction mixture to a temperature of from 90° C. to 150° C. for 30 minutes to 4 hours to generate a suspension comprising the char; and
   drying and compressing the char to form a char pellet fuel or a char briquette fuel having low water absorption.

14. The method of claim 13, wherein the raw material is selected from the group consisting of lumber or other wood waste, yard waste, paper waste, and biomass.

15. The method of claim 13, wherein the metal salt is $FeCl_3$.

16. The method of claim 13, wherein the carbonate salt is $Na_2CO_3$.

17. The method of claim 13, comprising separating a metal oxide from the suspension.

18. The method of claim 13, wherein the reaction mixture is mixed during heating.

19. The method of claim 1, wherein the dried char absorbs less than about 9.4% water on submersion for 15 hours.

20. The method of claim 13, wherein the pellet fuel or the briquette fuel absorbs less than about 9.4% water on submersion for 15 hours.

21. The method of claim 1 or claim 13, wherein the reaction mixture is heated for from 30 minutes to 90 minutes.

* * * * *